(12) United States Patent
Seo

(10) Patent No.: US 11,097,635 B2
(45) Date of Patent: Aug. 24, 2021

(54) BATTERY HEAT MANAGEMENT INTEGRATION SYSTEM AND OPERATION METHOD THEREOF

(71) Applicants: Hyundai Motor Company, Seoul (KR); Kia Motors Corporation, Seoul (KR)

(72) Inventor: Jung-Min Seo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 234 days.

(21) Appl. No.: 16/202,770

(22) Filed: Nov. 28, 2018

(65) Prior Publication Data

US 2020/0023751 A1 Jan. 23, 2020

(30) Foreign Application Priority Data

Jul. 19, 2018 (KR) .................. 10-2018-0084097

(51) Int. Cl.
| | |
|---|---|
| *B60L 58/26* | (2019.01) |
| *B60L 50/64* | (2019.01) |
| *B60L 58/27* | (2019.01) |
| *B60H 1/00* | (2006.01) |
| *H01M 10/6568* | (2014.01) |
| *H01M 10/613* | (2014.01) |
| *H01M 10/663* | (2014.01) |
| *H01M 10/625* | (2014.01) |
| *H01M 10/615* | (2014.01) |

(52) U.S. Cl.
CPC .......... *B60L 58/26* (2019.02); *B60H 1/00278* (2013.01); *B60L 50/64* (2019.02); *B60L 58/27* (2019.02); *H01M 10/613* (2015.04); *H01M 10/615* (2015.04); *H01M 10/625* (2015.04); *H01M 10/6568* (2015.04); *H01M 10/663* (2015.04); *B60L 2270/46* (2013.01); *H01M 2220/10* (2013.01)

(58) Field of Classification Search
CPC .... H01M 10/60; H01M 10/61; H01M 10/613; H01M 10/615; H01M 10/625; B60L 58/24; B60L 58/26; B60L 58/27
See application file for complete search history.

(56) References Cited

U.S. PATENT DOCUMENTS

| | | | |
|---|---|---|---|
| 9,701,215 B1 * | 7/2017 | Kim ................... | B60H 1/00278 |
| 2012/0180997 A1 | 7/2012 | Johnston et al. | |
| 2013/0298586 A1 * | 11/2013 | Hwang ................. | B60L 3/0046 62/239 |
| 2018/0111443 A1 | 4/2018 | Kim et al. | |

FOREIGN PATENT DOCUMENTS

| | | |
|---|---|---|
| CN | 106092603 A | 11/2016 |
| KR | 10-2017-0094015 A | 8/2017 |

OTHER PUBLICATIONS

European Search Report for European Patent Application No. 18210503, dated Mar. 15, 2019, 7 pages.

\* cited by examiner

*Primary Examiner* — Stephan J Essex
(74) *Attorney, Agent, or Firm* — Mintz Levin Cohn Ferris Glovsky and Popeo, P.C.; Peter F. Corless

(57) ABSTRACT

A battery heat management integration system is provided. The system includes a battery cooler that connects a battery in which battery cooling water is circulated and an air conditioning system in which air conditioner refrigerant is circulated. A heat exchange effect thus occurs between the battery cooling water and the air conditioner refrigerant.

8 Claims, 11 Drawing Sheets

BATTERY HEAT MANAGEMENT INTEGRATION SYSTEM AND OPERATION METHOD THEREOF

CROSS-REFERENCE TO RELATED APPLICATION

This application claims priority to Korean Patent Application No. 10-2018-0084097 filed on Jul. 19, 2018, which is incorporated herein by reference in its entirety.

BACKGROUND

Field of the Disclosure

The present disclosure relates to a battery heat management system, and more particularly, to a battery heat management integration system and an operation method thereof, that utilize the heat of the battery that has been previously cooled for the heating during colder temperatures.

Description of Related Art

Generally, a battery applied to an eco-friendly vehicle maintains a target temperature (e.g., set about 20-30° C. as the target temperature in a lithium-ion battery) that is independent of the surrounding environment, thus maintaining optimal performance and efficiency, and for this purpose, a battery heat management system is required. In particular, the eco-friendly vehicle includes an electric vehicle and a hybrid vehicle.

For this purpose, the battery heat management system is classified into an air-cooling type cooling device in which a battery is cooled using indoor air within a vehicle or a water cooling type cooling device in which a battery is cooled using cooling water. For example, the air cooling type cooling device type battery heat management system is applied to a small electric vehicle and a hybrid vehicle. The water cooling type cooling device type battery heat management system applied to a commercial electric vehicle is deformed into a chiller type battery heat management system that a water cooling type cooling device and a roof-on air conditioner are bundled together based on whether a high-voltage battery that supplies power to an electric motor (i.e., a driving motor) is applied, thus enhancing battery cooling effect.

Particularly, the chiller type battery heat management system converts the radiator mode for circulating the cooling water by the radiator of the engine cooling system and the chiller mode (or the air conditioner mode) for operating the roof-on air conditioner into an ambient temperature condition to perform cooling. Accordingly, the chiller type battery heat management system is suitable for a commercial electric vehicle such as a bus since the water cooling type cooling device and the roof-on air conditioner independently configured on the roof are connected to the battery. However, this type of system is advantageously suitable for the environment in which the battery usage capacity and time of the high-voltage battery for supplying power to the electric motor (i.e., the driving motor) should be considered.

Additionally, the chiller type battery heat management system mounts the water cooling type cooling device and the roof-on air conditioner on the roof as independent parts, respectively, thus becoming disadvantageous in terms of a package by occupying a substantial amount of space on the roof due to redundant use of similar functional parts. The chiller type battery heat management system has only a difference of the degree depending upon the ambient temperature and is required to continuously consume energy for cooling the battery.

The contents described in section are merely to help the understanding of the background of the present disclosure, and can include what is not previously known to those skilled in the art to which the present disclosure pertains.

SUMMARY

Accordingly, an object of the present disclosure provides a battery heat management integration system and an operation method thereof, which may use the air conditioner of the air conditioning system instead of a separate roof-on air conditioner as the battery cooling structure to manage the battery temperature, thus simplifying the battery cooling structure to become advantage in terms of a package together with management efficiency. In particular, the battery heat management integration system may cool the battery in warmer temperatures by the heat exchange effect using cooling water and refrigerant and use the heat of the battery for heating in the colder temperatures, thus enhancing heating performance and heating consumption energy in addition to a battery temperature maintenance function.

A battery heat management integration system for achieving the object may include a battery cooler for connecting a battery in which battery cooling water is circulated and an air conditioning system in which air conditioner refrigerant is circulated, and the heat exchange effect occurs between the battery cooling water and the air conditioner refrigerant. The battery cooler may include a cooler line to separate the flow of the battery cooling water and the air conditioner refrigerant. The cooler line may be divided into a battery cooling line in which the battery cooling water is circulated and an air conditioning cooling line in which the air conditioner refrigerant is circulated.

Additionally, the battery cooling line may include a cooler inlet line for discharging the battery cooling water coming from the battery into the battery cooler, and a cooler outlet line for returning the battery cooling water coming from the battery cooler to the battery. The air conditioning cooling line may include a cooler inlet line for discharging the air conditioner refrigerant coming from the air conditioning system into the battery cooler, and a cooler outlet line for returning the air conditioner refrigerant coming from the battery cooler to the air conditioning system. The cooler inlet line of the battery cooling line may be connected to a cooler connection line connected with a battery cooler line for circulating the battery cooling water to a radiator.

The battery cooling line may further include a discharge line connected from the battery to the cooler connection line connected with the cooler inlet line, a via line connected to the discharge line to pass through the radiator, and a return line connected to the via line to be connected to the battery. The connection part of the cooler connection line and the discharge line may include a radiator path valve, and the connection part of the cooler connection line, the via line, and the cooler inlet line may include a battery cooler path valve. The radiator path valve and the battery cooler path valve are operated by a battery management system (BMS) to change the direction of a flow path.

In particular, the BMS may be configured to operate a cooling fan, a cooling water pump, and an electric heater. The cooling fan may be provided on the radiator; the cooling water pump may be provided on the discharge line; and the electric heater may be provided on the return line. The BMS may be connected with a temperature sensor. The temperature sensor may include a battery temperature sensor configured to detect the temperature of the battery, a battery cooling water temperature sensor configured to detect the temperature of the battery cooling water, and an atmospheric temperature sensor configured to detect as the ambient temperature.

Additionally, the BMS may be connected with an air conditioning control panel configured to adjust an operation mode of the air conditioning system, and the BMS may be in communication with the air conditioning control panel to perform the heat exchange operation of the battery cooler in a chiller mode. The BMS may be configured to transmit a battery temperature proportional value of the battery to the air conditioning control panel in the chiller mode.

According another aspect of the present disclosure, a battery heat management operation method may include a battery heat management mode control in which a battery heat management mode for the battery is divided into a radiator mode, a chiller mode, a maintenance mode, and a heater mode executed by a BMS, and the BMS may be configured to detect whether the air conditioning system operates to change a mode switching condition for the radiator mode, the chiller mode, the maintenance mode, and the heater mode.

In particular, the battery heat management mode control may determine whether the operation is performed in the order of the radiator mode, the chiller mode, the maintenance mode, and the heater mode depending on the battery detection temperature when the air conditioning system is operated. The radiator mode and the chiller mode, the chiller mode and the maintenance mode, and the maintenance mode and the heater mode may be mutually switched depending upon the battery detection temperature. The battery heat management mode control may be divided into an ambient temperature dependent control and an ambient temperature separation control depending on ambient temperature when the air conditioning system is not operated.

The ambient temperature dependent control may determine whether the operation is performed in the order of the chiller mode, the radiator mode, the maintenance mode, and the heater mode depending on the battery detection temperature; and the chiller mode and the radiator mode, the radiator mode and the maintenance mode. The maintenance mode and the heater mode may be mutually switched depending on the battery detection temperature. The ambient temperature separation control may determine whether the operation is performed in the order of the chiller mode, the maintenance mode, and the heater mode depending on the battery detection temperature; and the chiller mode and the maintenance mode. The maintenance mode and the heater mode may be mutually switched depending on the battery detection temperature.

The battery heat management integration system of the present disclosure operates the air conditioning system for battery cooling, thus implementing the following operations and effects.

Firstly, it may be possible to apply the air conditioner of the air conditioning system for battery cooling as a common part, thus simplifying the battery cooling structure.

Secondly, it may be possible to remove the roof-on air conditioner and associated parts, which are separately configured for battery cooling to perform the same function.

Thirdly, it may be possible to configure the battery cooling structure as a single system, thus improving the mounting package space for the roof of the bus.

Fourthly, it may be possible to use the radiator fan and a compressor for cooling of the roof-on air conditioner, etc., thus reducing the energy consumption for the battery cooling.

Fifthly, it may be possible to integrate the air conditioning system and the battery heat management system into the heat pump for the heat exchange between the cooling water and the refrigerant to use the heat of the battery for the heating, thus enhancing performance of the heat pump.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present disclosure will be described in detail with reference to the accompanying drawings, and the exemplary embodiment is one example and may be implemented in many various forms by those skilled in the art to which the present disclosure pertains, such that the exemplary embodiment described herein is not limited thereto.

Figure 1:
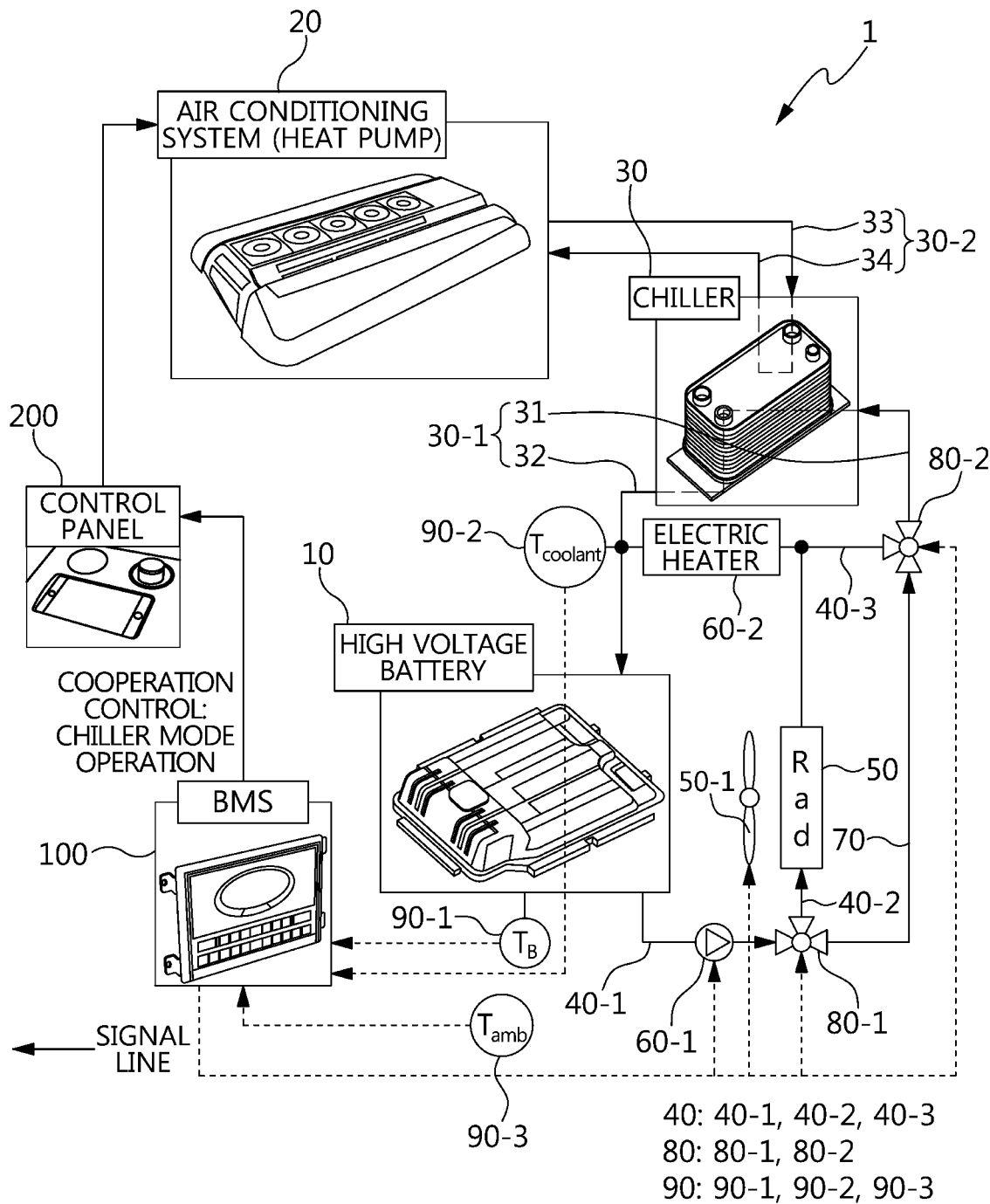
FIG. 1 is a block diagram of a battery heat management integration system in accordance with an exemplary embodiment of the present disclosure.

Referring to FIG. 1, a battery heat management integration system 1 may include a battery 10, an air conditioning system 20, a battery cooler 30, cooling lines 30-1, 30-2, a battery cooling line 40, a cooler connection line 70, a battery valve 80, a temperature sensor 90, a battery management system (BMS) 100, and an air conditioning control panel 200. Additionally, a controller of the BMS may be configured to operate the various components of the system.

In particular, the battery 10, the air conditioning system 20, and the battery cooler 30 form a battery heat management integration structure, and the battery heat management integration structure may be operated to cool the heat of the battery in the summer (e.g., during warmer temperatures) by the heat exchange effect of the battery cooler 30 and to use the heat of the battery for the heating in the winter (e.g., during colder temperatures). For example, the battery 10 may include a high-voltage battery of 42V or a low-voltage battery of 12V, which is used in the commercial electric vehicle such as a bus to consider battery usage capacity and time for supplying stable power to an electric motor (i.e., a driving motor). The air conditioning system 20 may include a heat pump system for implementing the heating function by the heat emission of an indoor heat exchanger in addition to the cooling/heating function through a change in the refrigerant circulation path. The battery cooler 30 may include a chiller as a heat exchanger.

The cooling lines 30-1, 30-2 may connect the battery cooler 30 to the battery 10 and the air conditioning system 20 to perform the heat exchange between the air conditioner refrigerant and the battery cooling water inside the battery cooler 30. For example, a battery cooling line 30-1 may include a cooler inlet line 31 for discharging the battery cooling water coming from the battery 10 into the battery cooler 30, and a cooler outlet line 32 for returning the battery cooling water coming from the battery cooler 30 to the battery 10. An air conditioning cooling line 30-2 may include a cooler inlet line 33 for discharging the air conditioner refrigerant coming from the air conditioning system 20 into the battery cooler 30, and a cooler outlet line 34 for returning the air conditioner refrigerant coming from the battery cooler 30 to the air conditioning system 20.

The battery cooler line 40 implements radiator heat exchange for the battery cooling water. Accordingly, the battery cooler line 40 may include a discharge line 40-1, a via line 40-2, and a return line 40-3. For example, the discharge line 40-1 may connect the battery 10 to a cooling water pump 60-1, and may extract the battery cooling water from the battery 10 during the operation of the cooling water pump 60-1 by the BMS 100. The via line 40-2 may connect the discharge line 40-1 to the radiator 50 equipped with a cooling fan 50-1 and may be connected with the discharge line 40-1 via a radiator path valve 80-1. The return line 40-3 may connect the via line 40-2 to the battery 10 via the cooler outlet line 32 of the battery cooling line 30-1, and may include a positive temperature coefficient (PTC) type electric heater 60-2.

The cooler connection line 70 may connect the battery cooler line 40 to the battery cooler 30, may be connected to the discharge line 40-1 and the via line 40-2 of the battery cooler line 40 via the radiator path valve 80-1, and may6 be connected to the return line 40-3 of the battery cooler line 40 and the cooler inlet line 31 of the battery cooling line 30-1 via a battery cooler path valve 80-2. The battery valve 80 applies a flow path control valve that may adjust a flow path to switch the battery heat management mode into a radiator mode, a chiller mode, a maintenance mode, and a heater mode, and types and the number of the valves may be combined depending upon a configuration of the system. For example, the battery valve 80 may include a radiator path valve 80-1 and the battery cooler path valve 80-2. In particular, the radiator path valve 80-1 may be a three-way valve for connecting the discharge line 40-1, the via line 40-2, and the cooler connection line 70, and the battery cooler path valve 80-2 may be a three-way valve for connecting the return line 40-3, the cooler inlet line 31, and the cooler connection line 70.

Further, the temperature sensor 90 may be configured to detect a temperature required for cooling the battery 10 and provide the temperature to the BMS 100. Accordingly, the temperature sensor 90 may include a battery temperature sensor 90-1 configured to detect the battery cell temperature of the battery 10, a battery cooling water temperature sensor 90-2 configured to detect the temperature of the battery cooling water, and an ambient temperature sensor 90-3 configured to detect the atmospheric temperature as the ambient temperature. In addition, although not illustrated, the temperature sensor 90 may further include an inner temperature sensor configured to detect the temperature of the vehicle interior.

In particular, the BMS 100 may be configured to measure a battery cell temperature, battery cooling water temperature, and ambient temperature to switch the battery heat management mode into the radiator mode, the chiller mode, the maintenance mode, and the heater mode based on the temperature condition. Additionally, the BMS 100 may be configured to operate each of the radiator path valve 80-1 and the battery cooler path valve 80-2 based on the mode determined according to the temperature, and may be configured to operate the cooling fan 50-1 and the cooling water pump 60-1 based on the cooling water temperature, thus managing the battery temperature. Particularly, the BMS 100 may be configured to transmit a proportional value depending upon the battery temperature together with a chiller mode operation signal to the air conditioning control panel 200 when the battery requiring the chiller mode operation is overheated.

The air conditioning control panel 200 may use an air conditioning cooling mode, an air conditioning maintenance mode, and an air conditioning heating mode as a dedicated function of the air conditioning system 20 to adjust a compressor speed, an indoor blower operation, etc. based on the inner temperature, cooling/heating demand temperature, etc. In addition, the air conditioning control panel 200 may change the condition for the radiator mode, the chiller mode, the maintenance mode, and the heater mode, which are the battery heat management mode, in connection with the BMS 100. Particularly, the air conditioning control panel 200 may request a proportional value based on the battery temperature when the chiller mode operation is requested by the BMS 100 to control it in cooperation with the BMS 100.

Figure 2:
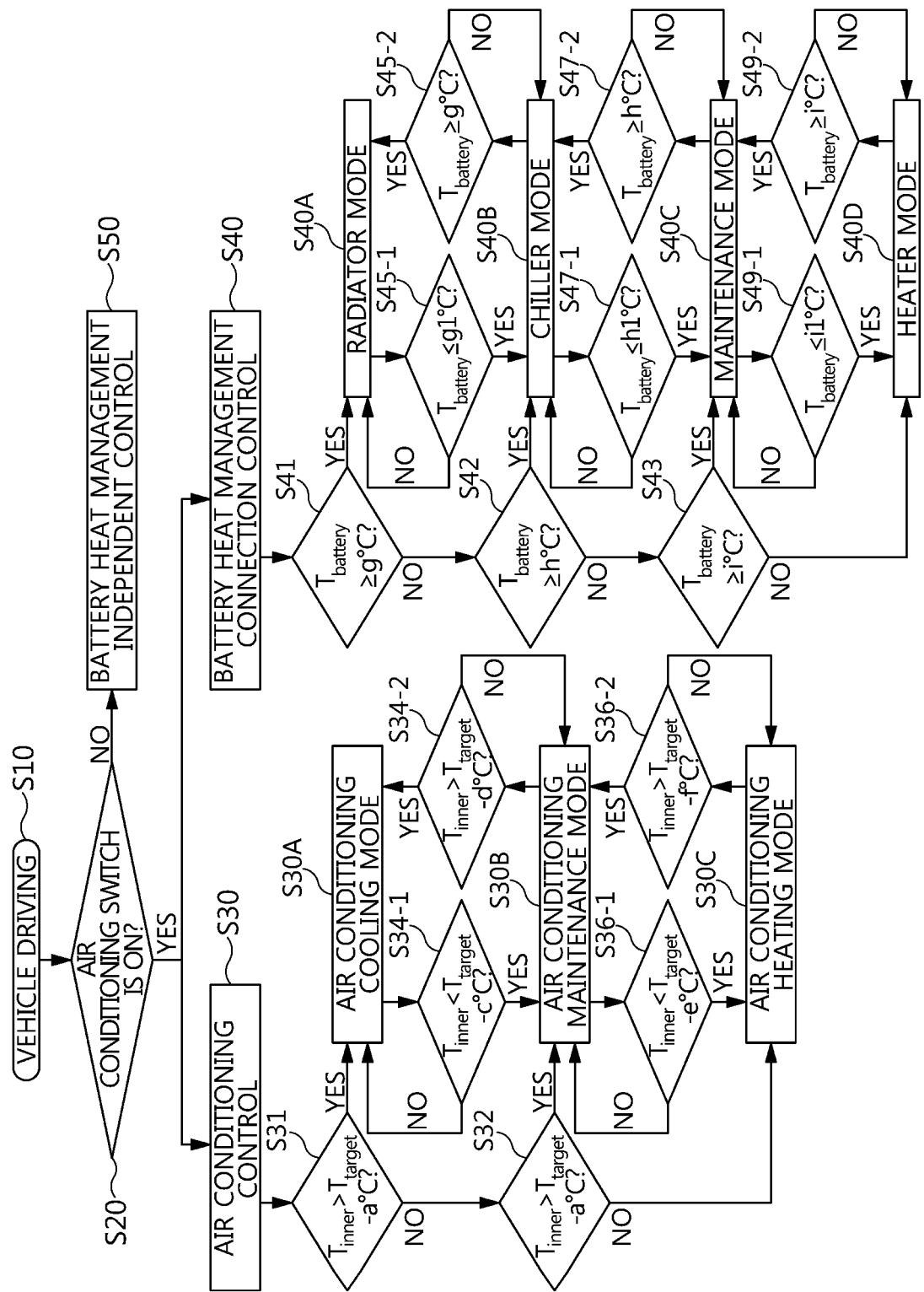
FIG. 2 is a flowchart of an air conditioning control and a battery heat management connection control among the air conditioning control, the battery heat management control, and a battery heat management independent control in a battery heat management operation method in accordance with an exemplary embodiment of the present disclosure.

Referring to FIG. 2, a battery heat management operation method of the battery heat management integration system 1 by the BMS 100 is illustrated. The method described herein below may be operated by a controller of the BMS 100. In particular, the BMS 100 may be configured to detect an air conditioning switch-On S20 upon driving the vehicle S10 and perform a battery heat management connection control S40 together with an air conditioning control S30 when the air conditioning switch is On, while performing the battery heat management independent control S50 when the air conditioning switch is Off.

Particularly, the air conditioning control S30 is a dedicated mode function control of the air conditioning system 20 for an air conditioning cooling mode, an air conditioning maintenance mode, and an air conditioning heating mode, which are based on the inner temperature. For example, the air conditioning control S30 may be include determining cooling inner temperature for the air conditioning cooling mode S30A S31, determining heating inner temperature for the air conditioning maintenance mode S30B or the air conditioning heating mode S30C S32, determining target cooling temperature change for maintaining the air conditioning cooling mode 30A S34-1/S34-2, and determining target heating temperature change for switching the air conditioning heating mode 30C S36-1/S36-2.

Accordingly, a cooling inner temperature determination formula of the determining the cooling inner temperature S31, a heating inner temperature determination formula of the determining the heating inner temperature S32, a target cooling temperature change determination formula of the determining the target cooling temperature change S34-1/S34-2, and a target heating temperature change determination formula of the determining the target heating temperature change S36-1/S36-2 are applied in a unit of temperature (° C.), respectively, as follows.

Cooling inner temperature determination formula:
$T_{inner} > T_{target} - a$

Heating inner temperature determination formula:
$T_{inner} > T_{target} - b$

Target cooling temperature change determination formula: $T_{inner} < T_{target} - c, T_{inner} > T_{target} - d$ Target heating temperature change determination formula: $T_{inner} < T_{target} - e, T_{inner} > T_{target} - f$ wherein, "$T_{inner}$" refers to a temperature detected by an inner temperature sensor (not illustrated), "$T_{target}$" is a target temperature that is set for cooling/heating in the vehicle interior, and is changed based on the cooling/heating so is not limited to a specific value. Then, "a, b, c, d, e, f" refer to a margin for the target temperature as a threshold value for the corresponding temperature, respectively, and are tuning values that are not limited to specific values. In addition, ">, <" refers to the inequalities indicating the magnitude of the two values.

The air conditioning mode control may be switched from the result of the inner temperature determination formula as follows. For example, in response to determining that "the satisfaction of a condition of $T_{inner} > T_{target} - a$" in the determining the cooling mode S31, the air conditioning cooling mode S30A may be performed, and in response to determining that "the satisfaction of a condition of "$T_{inner} < T_{target} - c$ or the non-satisfaction of a condition of $T_{inner} > T_{target} - d$" in the air conditioning mode S30A, the mode may be switched to the air conditioning maintenance mode S30B, while in the opposite case, the air conditioning cooling mode S30A may be maintained.

For example, in response to determining that "the satisfaction of a condition of $T_{inner} > T_{target} - b$" in the determining the heating mode S32, the air conditioning maintenance mode S30B may be performed, while in response to determining that "the non-satisfaction of a condition of $T_{inner} > T_{target} - b$", the air conditioning heating mode S30C may be performed. Additionally, in response to determining that "the satisfaction of a condition of the $T_{inner} < T_{target} - e$ or the non-satisfaction of a condition of $T_{inner} > T_{target} - f$" in the air conditioning maintenance mode S30B, the mode may be switched into the air conditioning heating mode S30C, while in the opposite case, the air conditioning maintenance mode S30B may be maintained.

Further, the battery heat management connection control S40 is a battery heat management mode function control for the radiator mode, the chiller mode, the maintenance mode, and the heater mode, which are based on an ambient temperature signal of the ambient temperature sensor 90-3. For example, the battery heat management connection control S40 may include determining a battery over-temperature condition for the radiator mode S40A S41, determining a battery high-temperature condition for the chiller mode S40B S42, determining a battery low-temperature condition for the maintenance mode S40C or the heater mode S40D S43, determining a battery over-temperature condition change for maintaining the radiator mode S40A S45-1/S45-2, determining a battery high-temperature condition change for maintaining the chiller mode S40B S47-1/S47-2, and determining a battery low-temperature condition change for switching the heater mode S40D S49-1/S49-2.

In particular, a battery over-temperature condition determination formula of the determining the battery over-temperature condition S41, a battery high-temperature condition determination formula of the determining the battery high-temperature condition S42, a battery low-temperature condition determination formula of the determining the battery low-temperature condition S43, a battery over-temperature condition change determination formula of the determining the battery over-temperature condition change S45-1/S45-2, a battery high-temperature condition change determination formula of the determining the battery high-temperature condition change S47-1/S47-2, and a battery low-temperature condition change determination formula of the determining the battery low-temperature condition change S49-1/S49-2 are applied in a unit of temperature (° C.), respectively, as follows.

Battery over-temperature condition determination formula: $T_{battery} \geq g$

Battery high-temperature condition determination formula: $T_{battery} \geq h$

Battery low-temperature condition determination formula: $T_{battery} \geq i$

Battery over-temperature condition change determination formula: $T_{battery} \leq g1, T_{battery} \geq g$ Battery high-temperature condition change determination formula: $T_{battery} \leq h1, T_{battery} \geq h$ Battery low-temperature condition change determination formula: $T_{battery} \leq i1, T_{battery} \geq i$ wherein, ">, <" refers to the inequalities indicating the magnitude of the two values, "$T_{inner}$" refers to a temperature detected by the battery temperature sensor 90-1, and "g, h, i, g1, h1, i1" refer to a margin for the temperature condition as a threshold value for the corresponding temperature, respectively, and are tuning values. However, if necessary, g may be applied as 28° C., has 20° C., i as 6° C., g1 as 26° C., h1 as 15° C., and it as 5° C.

Accordingly, the battery heat management mode control may be switched from the result of the battery determination formula as follows. For example, in response to determining that "the satisfaction of a condition of $T_{battery} \geq g$" in the determining the battery over-temperature condition S41, the radiator mode S40A may be performed, and in response to determining "the satisfaction of a condition of the $T_{battery} \leq g1$ or the non-satisfaction of a condition of $T_{battery} \geq g$" in the radiator mode S40A, the mode may be switched into the chiller mode S40B, while in the opposite case, the radiator mode S40A may be maintained.

For example, in response to determining that "the satisfaction of a condition of $T_{battery} \geq h$" in the determining the battery high-temperature condition S42, the chiller mode S40B may be performed, and in response to determining that "the satisfaction of a condition of the $T_{battery} \leq h1$ or the non-satisfaction of a condition of $T_{battery} \geq h$" in the chiller mode S40B, the mode may be switched into the maintenance mode S40C, while in the opposite case, the chiller mode S40B may be maintained. Additionally, in response to determining "the satisfaction of a condition of $T_{battery} \geq i$" in the determining the battery low-temperature condition S43, the maintenance mode S40C may be performed, and in response to determining that "the satisfaction of a condition of the $T_{battery} \leq i1$ or the non-satisfaction of a condition of $T_{battery} \geq i$" in the maintenance mode S40C, the mode may be switched into the heater mode S40D, while in the opposite case, the maintenance mode S40C may be maintained.

Figure 3:
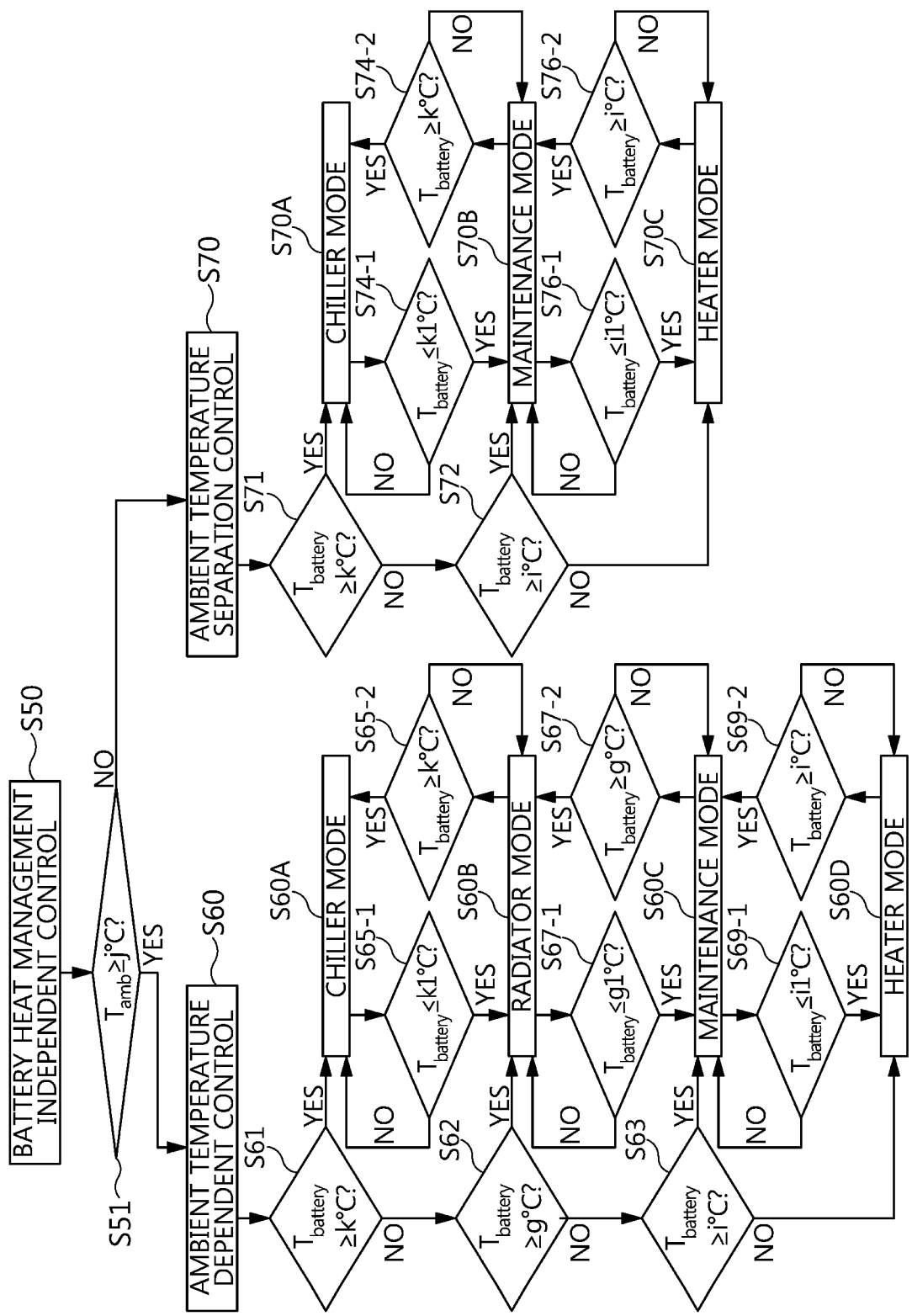
FIG. 3 is a flowchart of the battery heat management independent control in the battery heat management operation method in accordance with an exemplary embodiment of the present disclosure.

Moreover, referring to FIG. 3, the battery heat management independent control S50 may be divided into an ambient temperature dependent control S60 and an ambient temperature separation control S70 based on determining the ambient temperature S51. For example, the determining the ambient temperature SM applies the following ambient temperature determination formula.

Ambient temperature determination formula: $T_{amb} \geq j$ wherein, "$T_{amb}$" refers to a temperature detected by the ambient temperature sensor 90-3, and "j" refers to a margin for the ambient temperature condition as a threshold value for the corresponding temperature, and is a tuning value. However, if necessary, j may be applied as 24° C. In addition, ">, <" refers to the inequalities indicating the magnitude of the two values.

Accordingly, in response to determining "the satisfaction of a condition of $T_{amb} \geq j$" in the determining the ambient temperature S51, the control may be switched into the ambient temperature dependent control S60, while in the opposite case, the control may be switched into the ambient temperature separation control S70. Specifically, the ambient temperature dependent control S60 may include determining a battery ultra-high-temperature condition for the chiller mode S60A S61, determining a battery over-temperature condition for the radiator mode S60B S62, determining a battery low-temperature condition for the maintenance mode S60C or the heater mode S60D S63, determining a battery ultra-high-temperature condition change for maintaining the chiller mode S60A, S65-1/S65-2, determining a battery over-temperature condition change for maintaining the radiator mode S60B, S67-1/S67-2, and determining a battery low-temperature condition change for switching the heater mode S60D, S69-1/S69-2.

Accordingly, a battery ultra-high-temperature condition determination formula of the determining the battery ultra-high-temperature condition S61, a battery over-temperature condition determination formula of the determining the battery over-temperature condition S62, a battery low-temperature condition determination formula of the determining the battery low-temperature condition S63, a battery ultra-high-temperature condition change determination formula of the determining the battery ultra-high-temperature condition change S65-1/S65-2, a battery over-temperature condition change determination formula of the determining the battery over-temperature condition change S67-1/S67-2, and a battery low-temperature condition change determination formula of the determining the battery low-temperature condition change S69-1/S69-2 are applied in a unit of temperature (° C.), respectively, as follows.

Battery ultra-high-temperature condition determination formula: $T_{battery} \geq k$ Battery over-temperature condition determination formula: $T_{battery} \geq g$ Battery low-temperature condition determination formula: $T_{battery} \geq i$ Battery ultra-high-temperature condition change determination formula: $T_{battery} \leq k1, T_{battery} \geq k$ Battery over-temperature condition change determination formula: $T_{battery} \leq g1, T_{battery} \geq g$ Battery low-temperature condition change determination formula: $T_{battery} \leq i1, T_{battery} \geq i$ wherein, ">, <" refers to the inequalities indicating the magnitude of the two values, "$T_{battery}$" refers to a temperature detected by the battery temperature sensor 90-1, and "k, g, i, k1, g1, i1" refer to a margin for the temperature condition as a threshold value for the corresponding temperature, respectively, and are tuning values. However, if necessary, k may be applied as 33° C., gas 28° C., i as 6° C., k1 as 24° C., g1 as 26° C., and i1 as 5° C.

Accordingly, the battery heat management mode control of the ambient temperature dependent control S60 may be switched based on the result of the battery determination formula as follows. For example, in response to determining that "the satisfaction of a condition of $T_{battery} \geq k$" in the determining the battery ultra-high-temperature condition S61, the chiller mode S60A may be performed, and in response to determining that "the satisfaction of a condition of the $T_{battery} \leq k1$ or the non-satisfaction of a condition of $T_{battery} \geq k$" in the chiller mode S60A, the mode may be switched into the radiator mode S60B, while in the opposite case, the chiller mode S60A may be maintained.

Further, in response to determining that "the satisfaction of a condition of $T_{battery} \geq g$" in the determining the battery over-temperature condition S62, the radiator mode S60B may be performed, and in response to determining that "the satisfaction of a condition of the $T_{battery} \leq g1$ or the non-satisfaction of a condition of $T_{battery} \geq g$" in the radiator mode S60B, the mode may be switched into the maintenance mode S60C, while in the opposite case, the radiator mode S60B may be maintained. In response to determining that "the satisfaction of a condition of $T_{battery} \geq i$" in the determining the battery low-temperature condition S63, the maintenance mode S60C may be performed, while in response to determining that "the non-satisfaction of a condition of the $T_{battery} \geq i$," the heater mode S60D may be performed. In response to determining that "the satisfaction of a condition of $T_{battery} \leq i1$ or the non-satisfaction of a condition of $T_{battery} \geq i$" in the maintenance mode S60C, the mode may be switched into the heater mode S60D, while in the opposite case, the maintenance mode S60C may be maintained.

Particularly, the ambient temperature separation control S70 may include determining a battery ultra-high-temperature condition for the chiller mode S70A, S71, determining a battery low-temperature condition for the maintenance mode S70B or the heater mode S70C S72, determining a battery ultra-high-temperature condition change for maintaining the chiller mode S70A, S74-1/S74-2, and determining a battery low-temperature condition change for switching the heater mode S70C, S76-1/S76-2.

Accordingly, a battery ultra-high-temperature condition determination formula of the determining the battery ultra-high-temperature condition S71, a battery low-temperature condition determination formula of the determining the battery low-temperature condition S72, a battery ultra-high-temperature condition change determination formula of the determining the battery ultra-high-temperature condition change S74-1/S74-2, and a battery low-temperature condition change determination formula of the determining the battery low-temperature condition change S76-1/S76-2 are applied in a unit of temperature (° C.), respectively, as follows.

Battery ultra-high-temperature condition determination formula: $T_{battery} \geq k$ Battery low-temperature condition determination formula: $T_{battery} \geq i$ Battery ultra-high-temperature condition change determination formula: $T_{battery} \leq k1, T_{battery} \geq k$ Battery low-temperature condition change determination formula: $T_{battery} \leq i1, T_{battery} \geq i$ wherein, ">, <" refers to the inequalities indicating the magnitude of the two values, "$T_{battery}$" refers to a temperature detected by the battery temperature sensor 90-1, and "k, i, k1, i1" refer to a margin for the temperature condition as a threshold value for the corresponding temperature, respectively, and are tuning values. However, if necessary, k may be applied as 33° C., i as 6° C., k1 as 24° C., and i1 as 5° C.

Accordingly, the battery heat management mode control of the ambient temperature separation control S70 may be switched based on the result of the battery determination formula as follows. For example, in response to determining that "the satisfaction of a condition of $T_{battery} \geq k$" in the determining the battery ultra-high-temperature condition S71, the chiller mode S70A may be performed, and in response to determining that "the satisfaction of a condition of the $T_{battery} \leq k1$ or the non-satisfaction of a condition of $T_{battery} \geq k$" in the chiller mode S70A, the mode may be switched into the maintenance mode S70B, while in the opposite case, the chiller mode S70A may be maintained.

Additionally, in response to determining that "the satisfaction of a condition of $T_{battery} \geq i$" in the determining the battery low-temperature condition S73, the maintenance mode S70B may be performed, while in response to determining "the non-satisfaction of a condition of $T_{battery} \geq i$," the heater mode S70C may be performed. In response to determining that "the satisfaction of a condition of the $T_{battery} \leq i1$ or the non-satisfaction of a condition of $T_{battery} \geq i$" in the maintenance mode S70B, the mode may be switched into the heater mode S70C, while in the opposite case, the maintenance mode S70B may be maintained.

Meanwhile, FIGS. 4 to 7 illustrate the operation of the battery cooler 30 and the peripheral device in the mode operation of the battery heat management connection control S40, and FIGS. 8 to 11 illustrate the operation of the battery cooler 30 and the peripheral devices in the mode operation of the ambient temperature dependent control S60 and the ambient temperature separation control S70. Hereinafter, the comparison for the same mode will be described. Referring to the radiator mode 540A in FIG. 4 and the radiator mode 560B in FIG. 8, the radiator mode 540A and the radiator mode 560B implement only the cooling operation through the radiator 50 and the cooling fan 50-1 without the heat exchange effect by the battery cooler 30.

Particularly, in the radiator mode 540A and the radiator mode 560B, the operation control of the BMS 100 may be configured to operate the cooling water pump 60-1, open the path of the radiator path valve 80-1 to the via line 40-2, and operate the cooling fan 50-1. As a result, the flow path may be formed to allow the battery cooling water to flow from the battery 10 to the discharge line 40-1 to flow from the via line 40-2 into the radiator 50 through the radiator via valve 80-1, to flow from the radiator 50 into the return line 40-3 through the via line 40-2, and to flow from the return line 40-3 to the battery through the electric heater 60-2 and the cooler outlet line 32 of the battery cooling line 30-1. As a result, the battery cooling water may be cooled by the heat exchange with the outside through the radiator 50, and the heat exchange effect may be increased through the blowing operation of the cooling fan 50-1.

Figure 4:
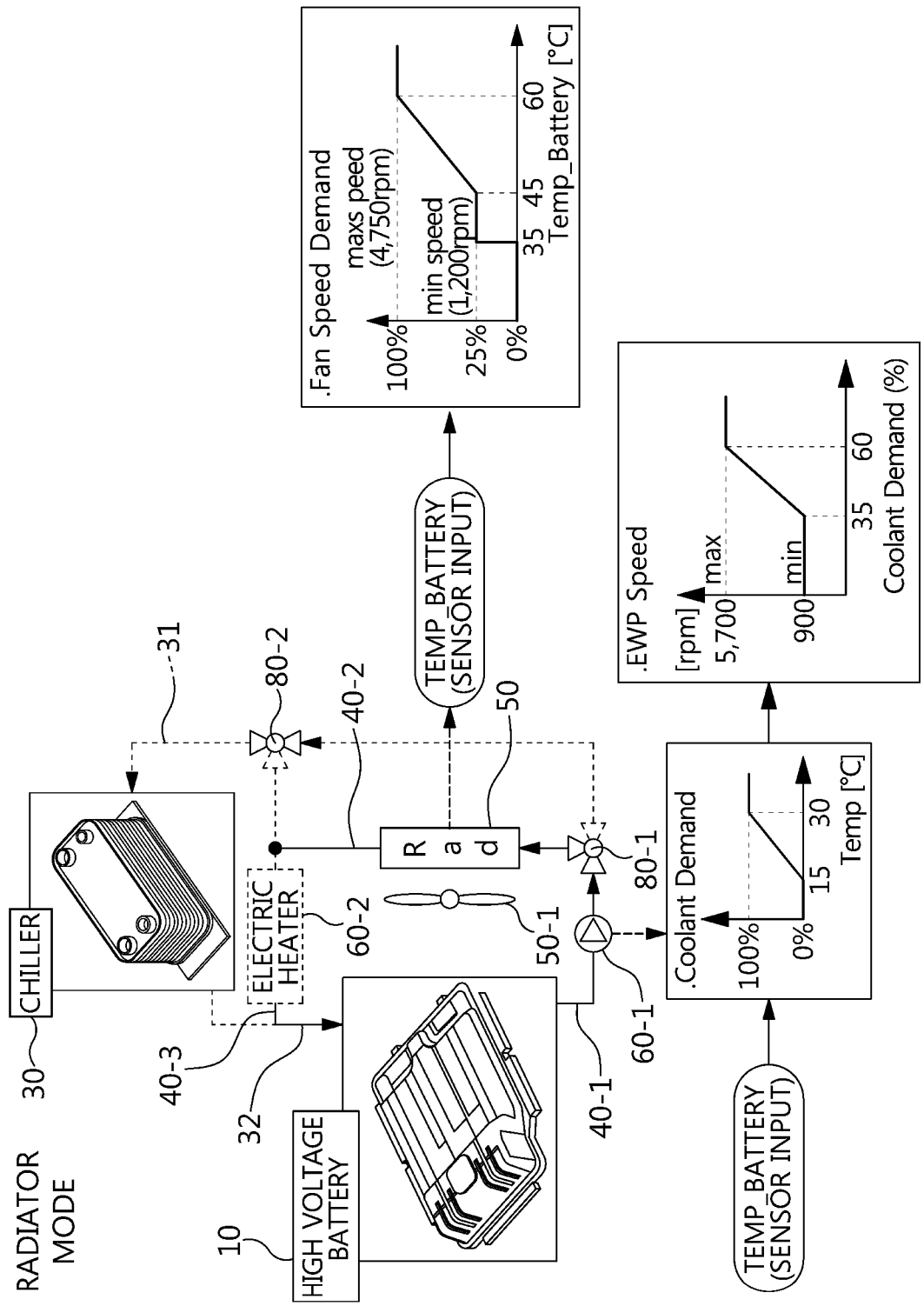
FIG. 4 is an operation state of the battery heat management integration system in the radiator mode applied to the battery heat management connection control in accordance with an exemplary embodiment of the present disclosure.
Figure 8:
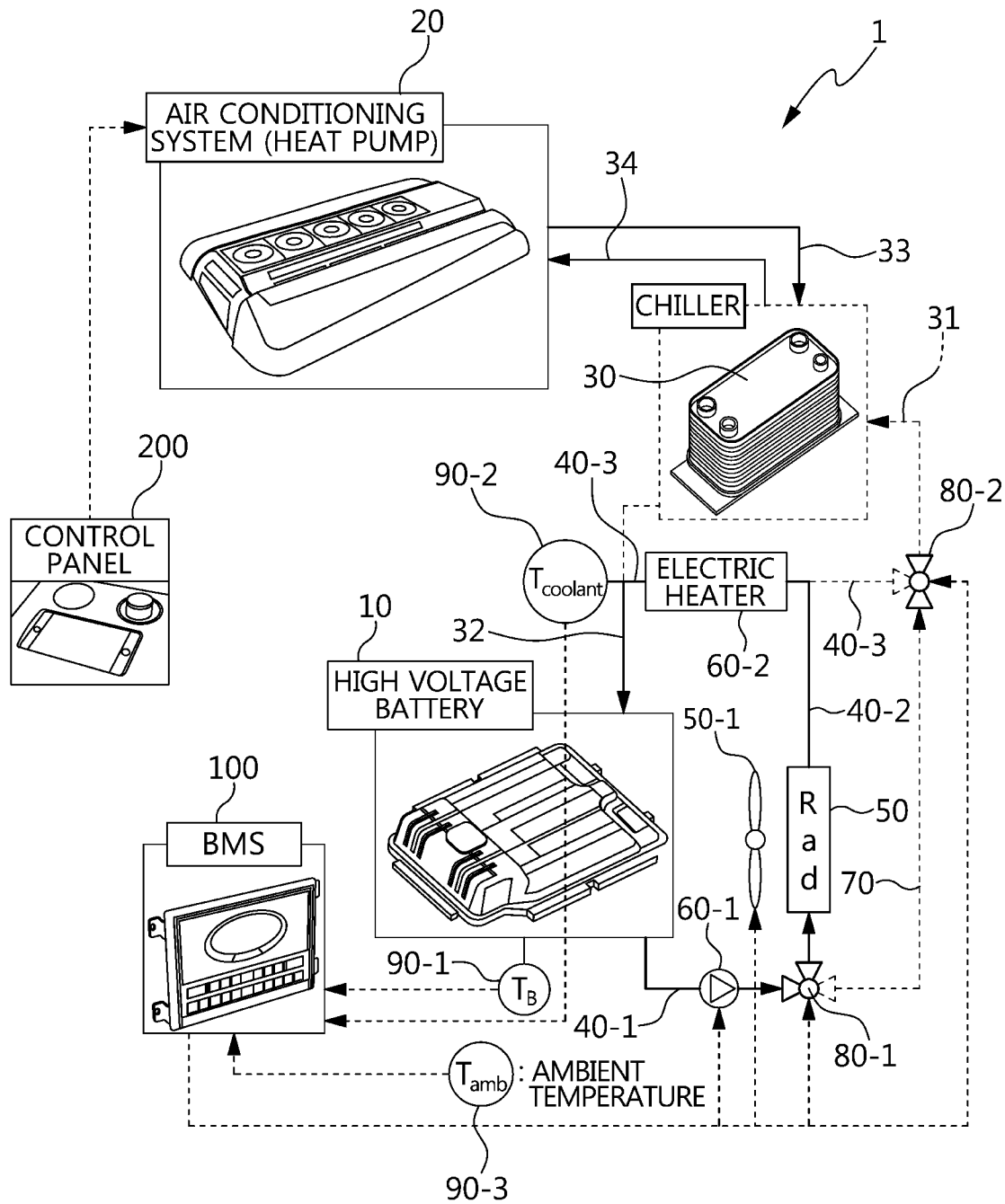
FIG. 8 is an operation state of the battery heat management integration system in the radiator mode applied to the battery heat management independent control in accordance with an exemplary embodiment of the present disclosure.

However, unlike the radiator mode 560B in FIG. 8, the radiator mode 540A in FIG. 4 matches a fan line diagram and a pump line diagram to a map table according to a battery cooling water temperature line diagram (or a battery temperature line diagram), and thus, the cooling fan 50-1 and the electric cooling water pump 60-1 may be operated based on the map table.

Figure 5:
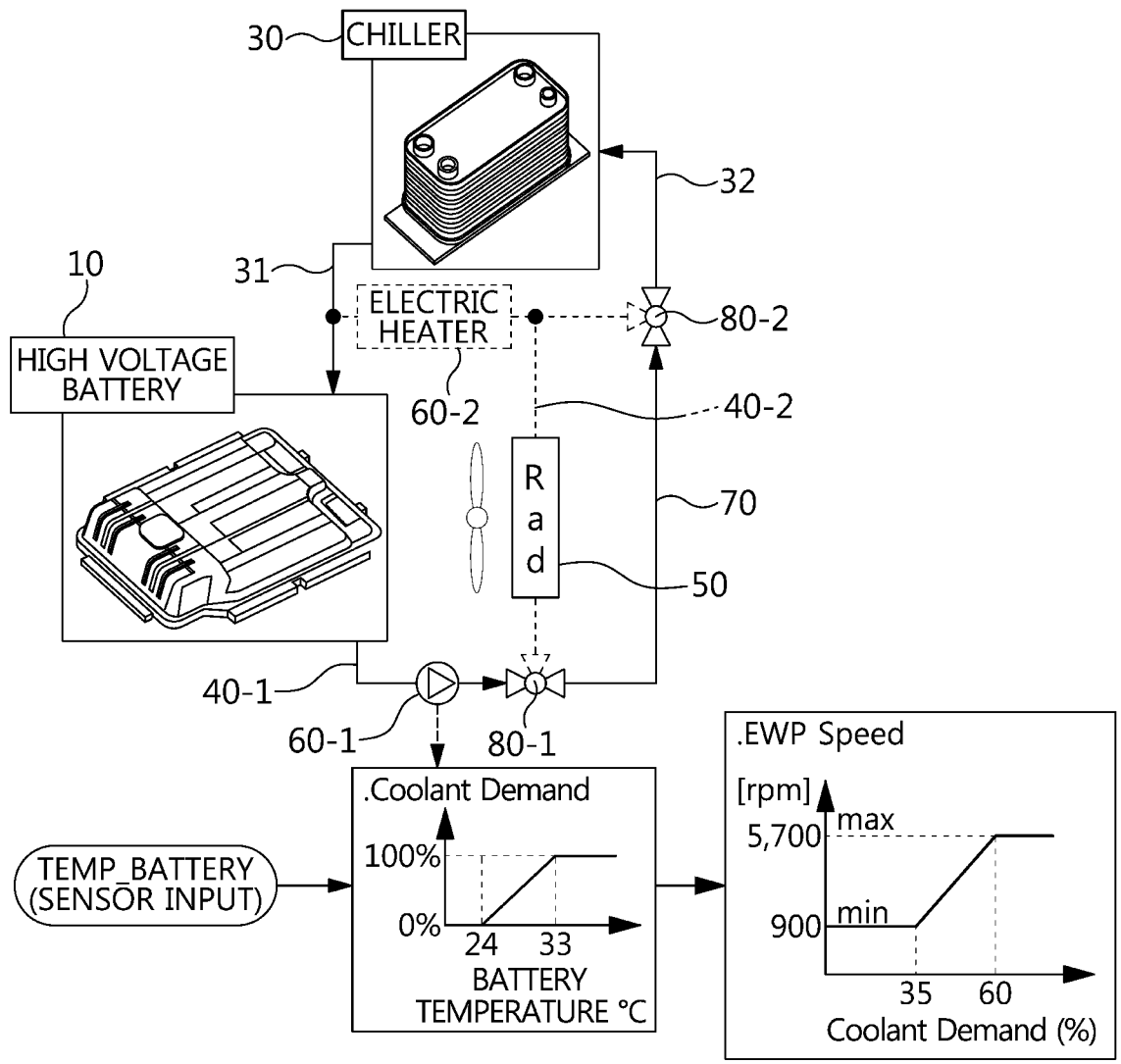
FIG. 5 is an operation state of the battery heat management integration system in the chiller mode applied to the battery heat management connection control in accordance with an exemplary embodiment of the present disclosure.
Figure 9:
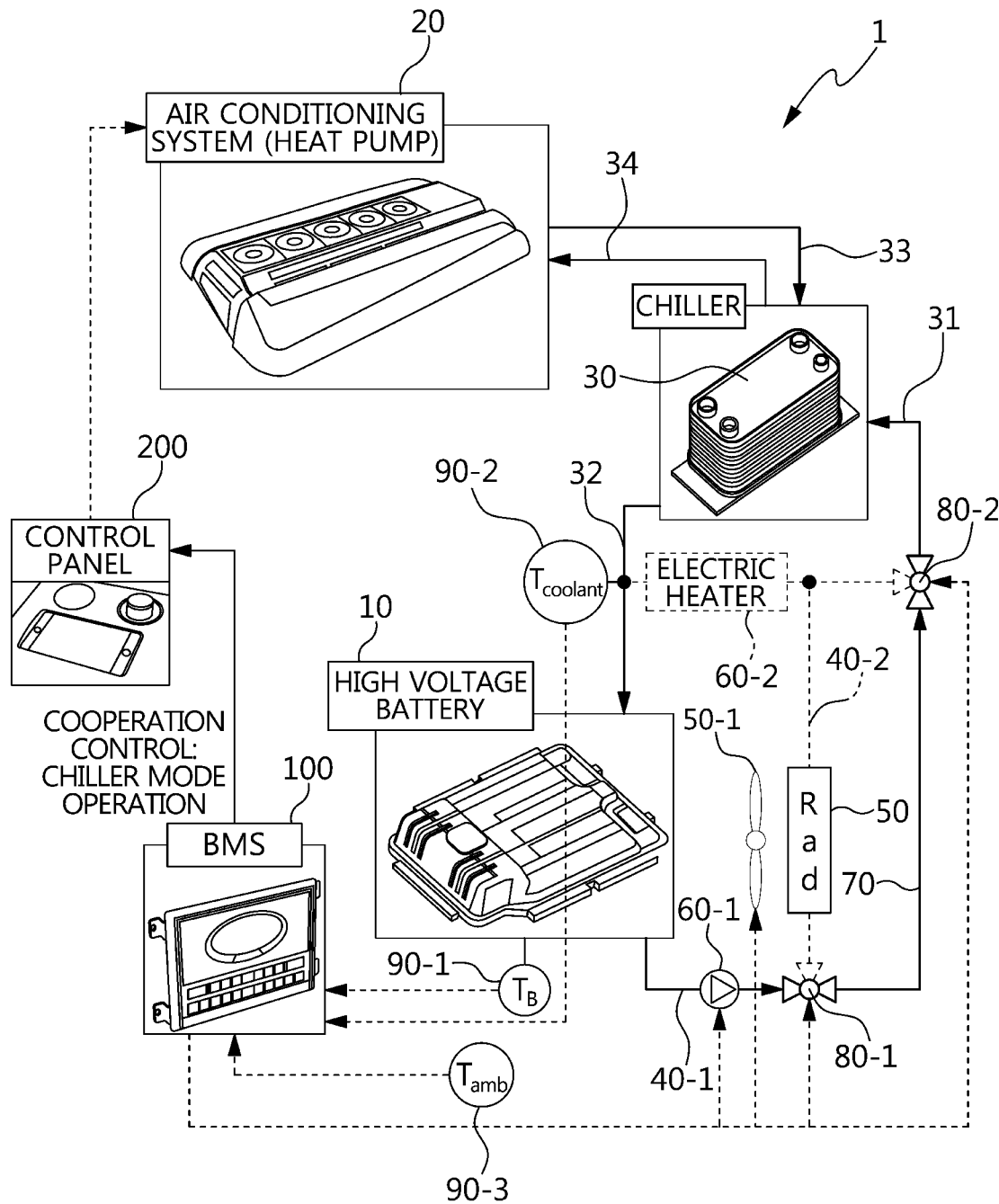
FIG. 9 is an operation state of the battery heat management integration system in the chiller mode applied to the battery heat management independent control in accordance with an exemplary embodiment of the present disclosure.

Referring to the chiller mode 540B in FIG. 5 and the chiller modes 560A, 570A in FIG. 9, the chiller mode S40B and the chiller modes S60A, S70A implement only the cooling operation through the battery cooler 30 without the heat exchange effect by the radiator 50 and the cooling fan 50-1. In the chiller mode S40B and the chiller modes S60A, S70A, the operation control of the BMS 100 may be configured to operate the cooling water pump 60-1, open the path of the radiator path valve 80-1 to the cooler connection line 70, and connect the path of the battery cooler path valve 80-2 to the cooler inlet line 31 of the battery cooling line 30-1. As a result, the flow path may be formed to allow the battery cooling water to flow from the battery 10 to the discharge line 40-1 to flow into the cooler connection line 70 through the radiator path valve 80-1, to flow from the cooler connection line 70 into the battery cooler 30 through the battery cooler path valve 80-2 and the cooler inlet line 31, and then return from the cooler outlet line 32 to the battery 10.

In this procedure, the battery cooling water may be cooled by the heat exchange operation with the air conditioner refrigerant of the air conditioning system 20 that circulates inside the battery cooler 30 through the cooler inlet line 33 and the cooler outlet line 34 of the air conditioning cooling line 30-2. However, unlike the chiller modes S60A, S70A in FIG. 9, the chiller mode S40B in FIG. 5 matches a pump line diagram to the map table according to a battery cooling water temperature line diagram (or a battery temperature line diagram), and thus, the electric cooling water pump 60-1 may be operated based on the map table.

Figure 6:
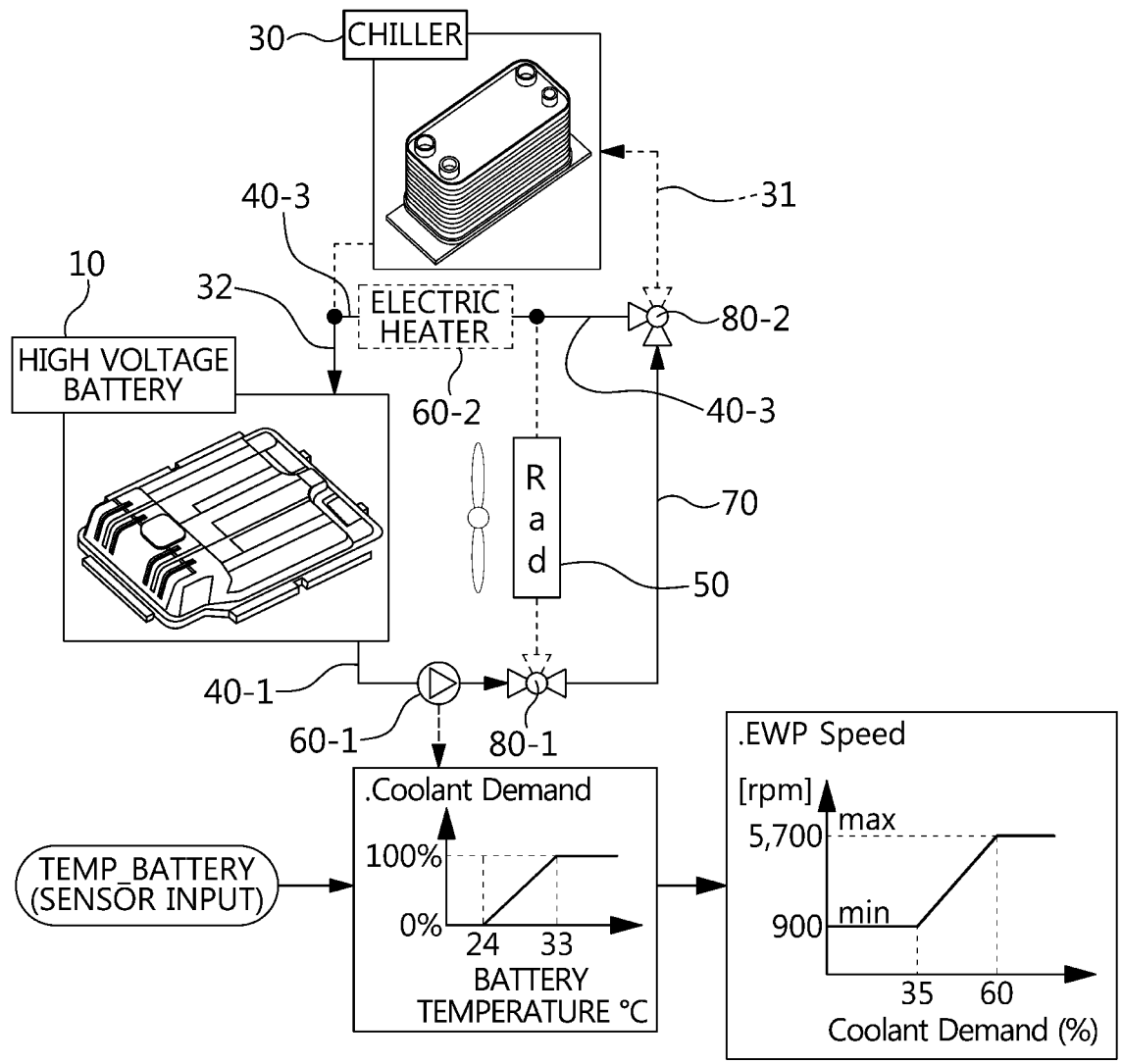
FIG. 6 is an operation state of the battery heat management integration system in the maintenance mode applied to the battery heat management connection control in accordance with an exemplary embodiment of the present disclosure.
Figure 10:
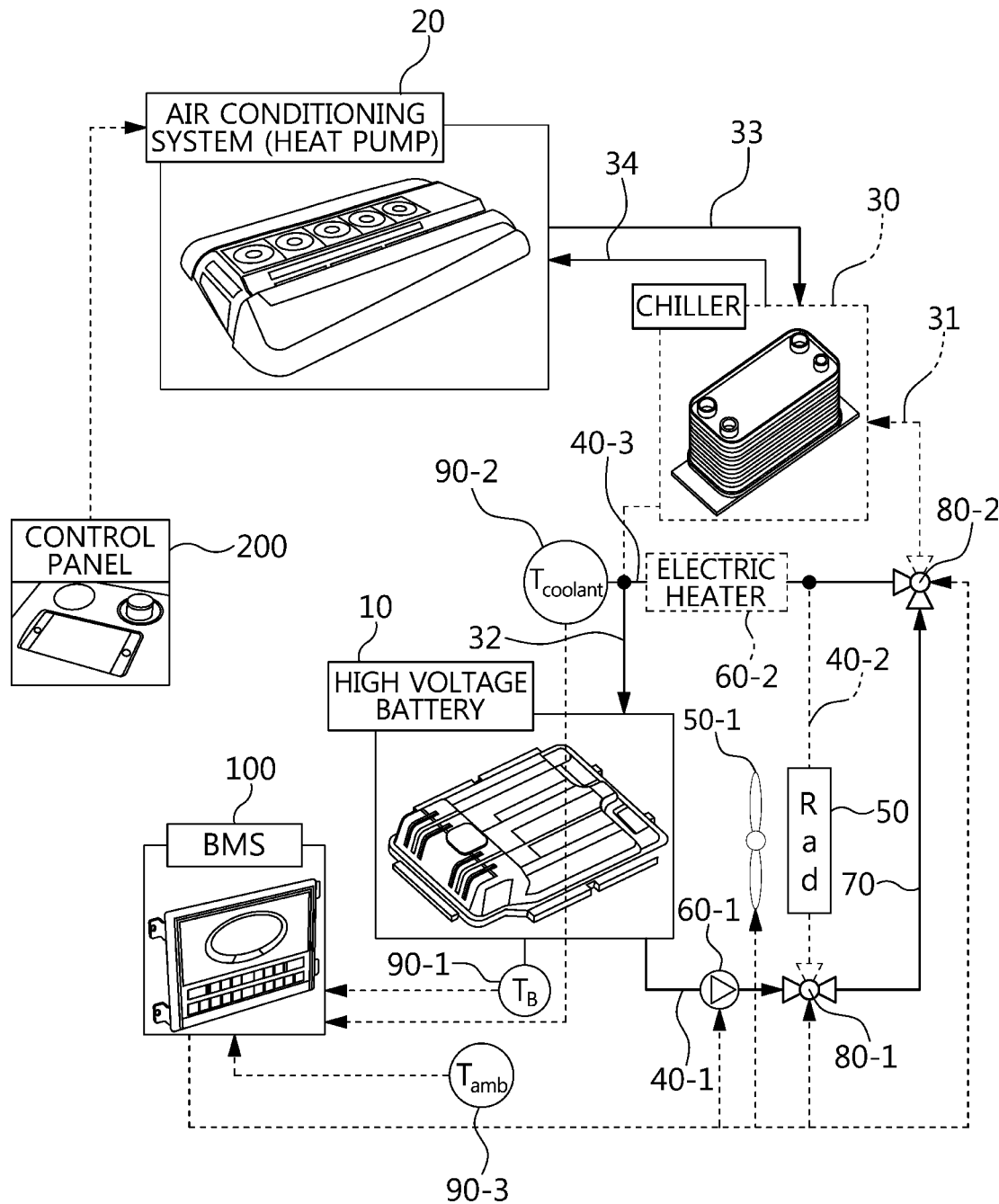
FIG. 10 is an operation state of the battery heat management integration system in the maintenance mode applied to the battery heat management independent control in accordance with an exemplary embodiment of the present disclosure.

Referring to the maintenance mode S40C in FIG. 6 and the maintenance modes S60C, S70B in FIG. 10, the maintenance mode S40C and the maintenance modes S60C, S70B implement only the circulation flow without the heat exchange effect by the battery cooler 30, the radiator 50, and the cooling fan 50-1.

In the maintenance mode S40C and the maintenance modes S60C, S70B, the operation control of the BMS 100 may be configured to operate the cooling water pump 60-1, open the path of the radiator path valve 80-1 to the cooler connection line 70, and open the path of the battery cooler path valve 80-2 to the via line 40-2. As a result, the flow path may be formed to allow the battery cooling water to flow from the battery 10 to the discharge line 40-1 to flow into the cooler connection line 70 through the radiator path valve 80-1, to flow into the return line 40-3 through the battery cooler path valve 80-2, and to flow from the return line 40-3 to the battery 10 through the electric heater 60-2 and the cooler outlet line 32 of the battery cooling line 30-1.

However, unlike the maintenance modes S60C, S70B in FIG. 10, the maintenance mode S40C in FIG. 6 matches a pump line diagram to the map table according to a battery cooling water temperature line diagram (or a battery temperature line diagram), and thus, the electric cooling water pump 60-1 may be operated based on the map table.

Figure 7:
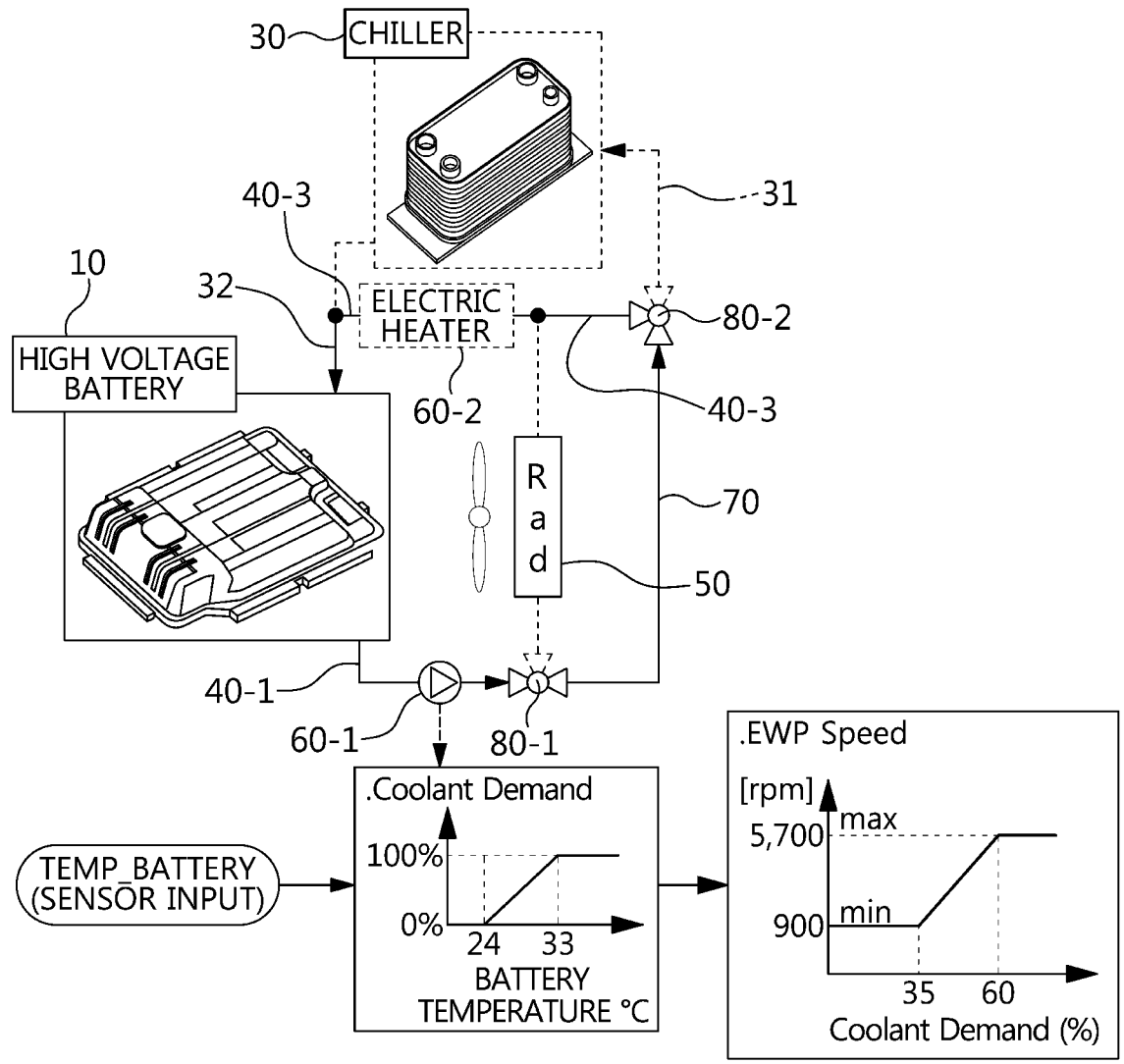
FIG. 7 is an operation state of the heat management integration system in the heater mode applied to the battery heat management connection control in accordance with an exemplary embodiment of the present disclosure.
Figure 11:
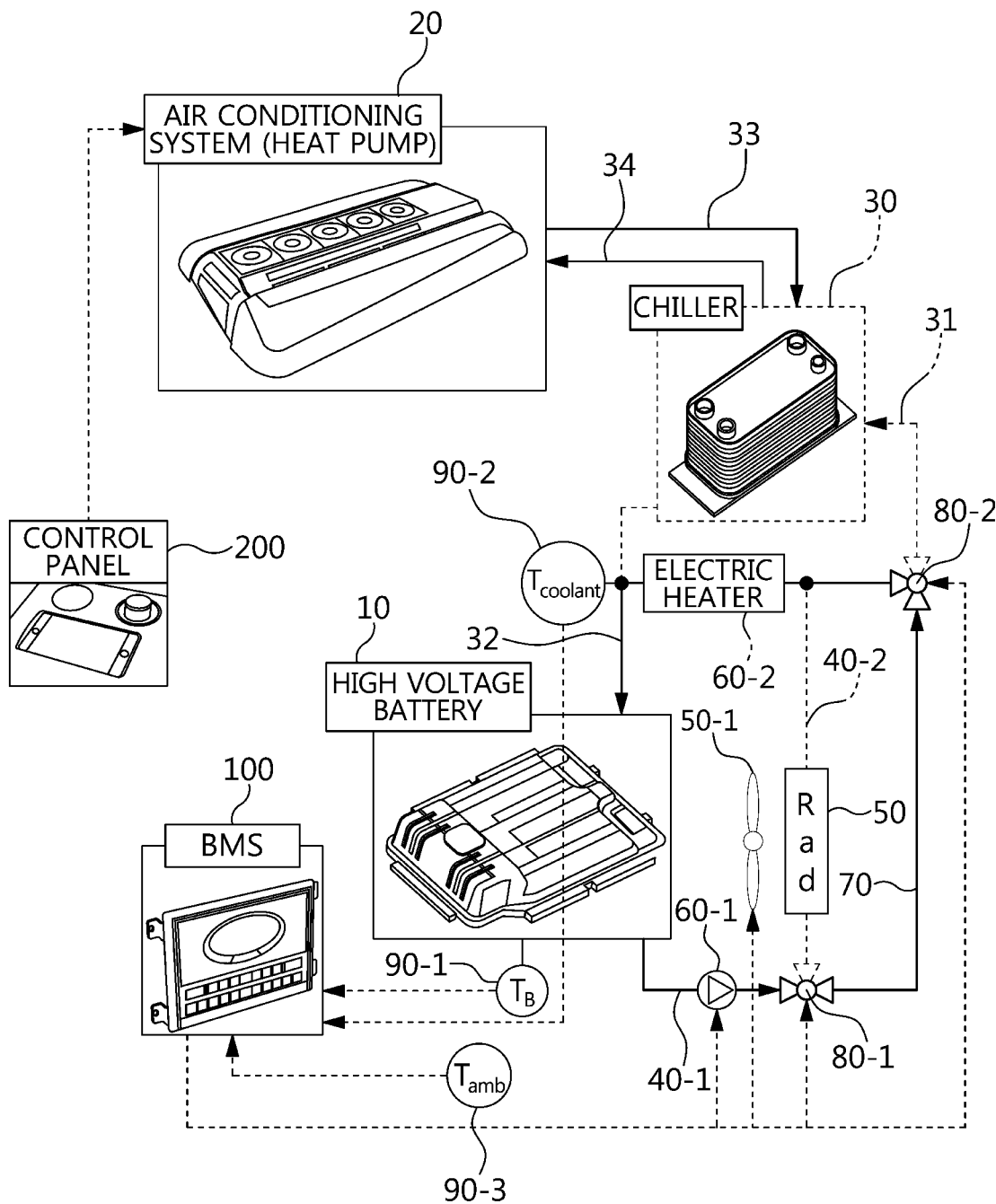
FIG. 11 is an operation state of the battery heat management integration system in the heater mode applied to the battery heat management independent control in accordance with an exemplary embodiment of the present disclosure.

Referring to the heater mode S40D in FIG. 7 and the heater modes S60D, S70C in FIG. 11, the heater mode S40D and the heater modes S60D, S70C implement the heat exchange effect for the electric heater 60-2 instead of the heat exchange effect by the battery cooler 30, the radiator 50, and the cooling fan 50-1.

In the heater mode S40D and the heater modes S60D, S70C, the operation control of the BMS 100 may be configured to operate the cooling water pump 60-1, open the path of the radiator path valve 80-1 to the cooler connection line 70, and connect the path of the battery cooler path valve 80-2 to the via line 40-2. As a result, the flow path may be formed to allow the battery cooling water to flow from the battery 10 to the discharge line 40-1 to flow into the cooler connection line 70 through the radiator path valve 80-1, to flow into the return line 40-3 through the battery cooler path valve 80-2, and after performing the heat exchange operation with the electric heater 60-2 of the operating state in the return line 40-3, return to the battery 10 through the cooler outlet line 32 of the battery cooling line 30-1. However, unlike the heater modes S60D, S70C in FIG. 11, the maintenance mode S40C in FIG. 7 matches a pump line diagram to the map table according to a battery cooling water temperature line diagram (or a battery temperature line diagram), and thus, the electric cooling water pump 60-1 may be operated based on the map table.

As described above, the battery heat management integration system in accordance with the present exemplary embodiment may include the battery cooler 30 for connecting the battery 10 in which the battery cooling water is circulated and the air conditioning system 20 in which the air conditioner refrigerant is circulated. The heat exchange effect may occur between the battery cooling water and the air conditioner refrigerant, thus variously performing the battery heat management mode control that is divided into the radiator mode, the chiller mode, the maintenance mode, and the heater mode according to the battery temperature may be executed by the battery management system (BMS) 100. Particularly, the battery may be cooled in the summer using the battery cooler 30 and heated using the heat of the battery in the winter.

What is claimed is:

1. A battery heat management integration system, comprising:
   a battery cooler that connects a battery in which battery cooling water is circulated and an air conditioning system in which air conditioner refrigerant is circulated, and causing the heat exchange effect between the battery cooling water and the air conditioner refrigerant;
   a battery cooling line in which the battery cooling water is circulated;
   an air conditioning cooling line in which the air conditioner refrigerant is circulated;
   a cooler connection line connected with a first cooler inlet line of the battery cooling line;
   a discharge line connected from the battery to the cooler connection line connected with the first cooler inlet line, a via line connected to the discharge line to pass through a radiator, and a return line connected to the via line to be connected to the battery; and
   a radiator path valve provided at a connection part of the cooler connection line and the discharge line, a battery cooler path valve provided at a connection part of the cooler connection line, the return line, and the first cooler inlet line.

2. The battery heat management integration system of claim 1, wherein the battery cooling line and the air conditioning cooling line separate the flow of the battery cooling water and the air conditioner refrigerant.

3. The battery heat management integration system of claim 1, wherein the battery cooling line includes the first cooler inlet line for discharging the battery cooling water coming from the battery into the battery cooler, and a first cooler outlet line for returning the battery cooling water coming from the battery cooler to the battery; and the air conditioning cooling line includes a second cooler inlet line for discharging the air conditioner refrigerant coming from the air conditioning system into the battery cooler, and a second cooler outlet line for returning the air conditioner refrigerant coming from the battery cooler to the air conditioning system.

4. The battery heat management integration system of claim 1, wherein the radiator path valve and the battery cooler path valve are operated by a battery management system (BMS) to change the direction of a flow path.

5. The battery heat management integration system of claim 4, wherein the BMS is configured to operate a cooling fan, a cooling water pump, and an electric heater, wherein the cooling fan is provided on the radiator, the cooling water pump is provided on the discharge line, and the electric heater is provided on the return line.

6. The battery heat management integration system of claim 4, wherein the BMS is connected with a temperature sensor and the temperature sensor includes a battery temperature sensor configured to detect the temperature of the battery, a battery cooling water temperature sensor configured to detect the temperature of the battery cooling water, and an atmospheric temperature sensor configured to detect as the ambient temperature.

7. The battery heat management integration system of claim 4, wherein the BMS is connected with an air conditioning control panel for executing an operation mode of the air conditioning system, and the BMS is in communication with the air conditioning control panel to perform the heat exchange operation of the battery cooler in a chiller mode.

8. The battery heat management integration system of claim 7, wherein the BMS is configured to transmit a battery temperature proportional value of the battery to the air conditioning control panel in the chiller mode.

* * * * *